(12) United States Patent
Hosoi

(10) Patent No.: US 8,478,055 B2
(45) Date of Patent: Jul. 2, 2013

(54) OBJECT RECOGNITION SYSTEM, OBJECT RECOGNITION METHOD AND OBJECT RECOGNITION PROGRAM WHICH ARE NOT SUSCEPTIBLE TO PARTIAL CONCEALMENT OF AN OBJECT

(75) Inventor: Toshinori Hosoi, Tokyo (JP)

(73) Assignee: NEC Corporation, Tokyo (JP)

( * ) Notice: Subject to any disclaimer, the term of this patent is extended or adjusted under 35 U.S.C. 154(b) by 833 days.

(21) Appl. No.: 12/595,312

(22) PCT Filed: Apr. 4, 2008

(86) PCT No.: PCT/JP2008/056776
§ 371 (c)(1),
(2), (4) Date: Oct. 9, 2009

(87) PCT Pub. No.: WO2008/126790
PCT Pub. Date: Oct. 23, 2008

(65) Prior Publication Data
US 2010/0142821 A1   Jun. 10, 2010

(30) Foreign Application Priority Data
Apr. 9, 2007   (JP) ................................. 2007-101904

(51) Int. Cl.
*G06K 9/62* (2006.01)
*G06K 9/00* (2006.01)
*G06K 9/34* (2006.01)
*G06F 17/18* (2006.01)

(52) U.S. Cl.
USPC ............ 382/228; 382/118; 382/173; 702/181

(58) Field of Classification Search
USPC .................................. 382/224, 228, 118, 173
See application file for complete search history.

(56) References Cited

U.S. PATENT DOCUMENTS

| | | |
|---|---|---|
| 7,304,712 B2 | 12/2007 | Sawasaki et al. |
| 7,525,631 B2 | 4/2009 | Lee et al. |
| 7,557,895 B2 | 7/2009 | Sawasaki et al. |
| 2002/0176627 A1 | 11/2002 | Monden |

(Continued)

FOREIGN PATENT DOCUMENTS

| | | |
|---|---|---|
| JP | 2001-283157 | 10/2001 |
| JP | 2002-288667 | 10/2002 |

(Continued)

OTHER PUBLICATIONS

International Search Report—PCT/JP2008/056776—May 1, 2008.

(Continued)

*Primary Examiner* — Kathleen Y Dulaney
(74) *Attorney, Agent, or Firm* — Young & Thompson

(57) ABSTRACT

An object recognition system in which fall of the recognition rate is suppressed when an object is recognized based on an image even if there is a partial concealment and the object can be recognized even if the region of concealment is large with large calculation amount. With regard to each of a plurality of partial regions of an object image, partial recognition score of recognition object category is determined by judging whether it is a recognition object category or not. Under a condition that it is a recognition object category, total score is calculated using the total product of nonoccurrence probability of the partial recognition score, and a judgment is made that the object is not a recognition object category by that total score.

27 Claims, 8 Drawing Sheets

U.S. PATENT DOCUMENTS

| | | | |
|---|---|---|---|
| 2004/0052418 A1* | 3/2004 | DeLean | 382/209 |
| 2005/0105780 A1 | 5/2005 | Ioffe | |
| 2005/0105806 A1 | 5/2005 | Nagaoka et al. | |
| 2005/0147302 A1 | 7/2005 | Leung | |
| 2006/0284837 A1 | 12/2006 | Stenger et al. | |

FOREIGN PATENT DOCUMENTS

| | | |
|---|---|---|
| JP | 2003-279997 | 10/2003 |
| JP | 2004-341214 | 12/2004 |
| JP | 2005-149507 | 6/2005 |
| JP | 2005-189662 | 7/2005 |
| JP | 2006-350434 | 12/2006 |
| JP | 2007-164129 | 6/2007 |

OTHER PUBLICATIONS

Akira Inoue et al.—Face Recognition using Local Area Matching—Multimedia Research Laboratories, NEC Corporation—D-12-57—p. 218.

Takashi Takahashi et al.—A Neural Network Classifier with Preprocessing to Correct Outliers in an Image—D-II vol. J87-D-II No. 5 pp. 1162-1169 May 2004.

Akira Monden et al.—Similarity based on probability that two fingers have no correlation—The Institute of Electronics, Information and Communication Engineers—Technical Report IEICE. PRMU2001-161 (Dec. 2001).

* cited by examiner

FIG. 4

$$\begin{pmatrix} S_1 \\ S_2 \\ \cdots \\ S_i \\ \cdots \\ S_M \end{pmatrix} \Rightarrow \begin{pmatrix} P(S_1 \mid \omega_c) \\ P(S_2 \mid \omega_c) \\ \cdots \\ P(S_i \mid \omega_c) \\ \cdots \\ P(S_M \mid \omega_c) \end{pmatrix}$$

FIG. 5

| INSTANCE | OCCURRENCE PROBABILITY IN PARTIAL REGION $P_i := P(S_i \mid \omega_c)$ | TOTAL SCORE (USING OCCURRENCE PROBABILITY) $\prod_{i=1}^{5} P(S_i \mid \omega_c)$ | TOTAL SCORE (USING NONOCCURRENCE PROBABILITY) $-\prod_{i=1}^{5} \{1 - P(S_i \mid \omega_c)\}$ |
|---|---|---|---|
| 1 | $\{p_1, \ldots, p_5\} = \{0.9, 0.9, 0.9, 0.9, 0.9\}$ | 0.59049 | −0.00001 |
| 2 | $\{p_1, \ldots, p_5\} = \{0.9, 0.9, 0.9, 0.9, 0.1\}$ | 0.06561 | −0.00009 |
| 3 | $\{p_1, \ldots, p_5\} = \{0.9, 0.9, 0.9, 0.1, 0.1\}$ | 0.00729 | −0.00810 |
| 4 | $\{p_1, \ldots, p_5\} = \{0.6, 0.6, 0.6, 0.6, 0.6\}$ | 0.07760 | −0.01024 |
| 5 | $\{p_1, \ldots, p_5\} = \{0.1, 0.1, 0.1, 0.1, 0.9\}$ | 0.00009 | −0.06561 |
| 6 | $\{p_1, \ldots, p_5\} = \{0.4, 0.4, 0.4, 0.4, 0.4\}$ | 0.01024 | −0.07760 |

22

23

24  25

OBJECT RECOGNITION SYSTEM, OBJECT RECOGNITION METHOD AND OBJECT RECOGNITION PROGRAM WHICH ARE NOT SUSCEPTIBLE TO PARTIAL CONCEALMENT OF AN OBJECT

TECHNICAL FIELD

The present invention relates to an object recognition system based on an image, an object recognition method and an object recognition program. More specifically, the present invention relates to an object recognition system, an object recognition method, and an object recognition program, which are not susceptible to partial concealment of an object.

BACKGROUND ART

When recognizing an object based on an image, normally, there is a tendency that the recognition rate is largely deteriorated when there is partial concealment generated in the object due to obstacles and noises. Non-Patent Document 1 and Non-Patent Document 2 depict examples of the object recognition system that is not susceptible to partial concealment.

Non-Patent Document 1 is an example in which a face is recognized based on an image. Operations of the object recognition system depicted in Non-Patent Document 1 are roughly as follows. First, an inputted face image is divided into partial regions, and feature extracting processing and recognition processing are conducted for each region. Then, only a certain number of regions exhibiting high similarity among recognition results of the individual partial regions are used to eliminate the region with concealment so as to calculate the final similarity. When this technique is used, it is almost possible to perform recognition even if there is partial concealment. However, it is not possible with this technique to simultaneously deal with both cases where the concealed region is wide and where the concealed region is narrow. Further, information of the regions with low similarity is not reflected upon the final result at all, so that there is a possibility of loosing useful information for recognition.

Non-Patent Document 2 uses a method which recollects a lost part of data by using a self-associative memory to complement an exception part of the inputted image, i.e., a part with concealment or noise, before recognizing the image. It is reported that a fine recognition result can be obtained with this technique even if there is concealment. However, it is necessary to execute calculation for recollecting the lost part of the data, which results in increasing the calculation amount. Further, it is necessary to prepare a large amount of data for training the self-associative memory so that it can recollect the lost part sufficiently.

Incidentally, the method as in Non-Patent Document 1, which divides the image into partial regions, recognizes those individually, and integrates each of the recognition results, changes its characteristics when the integration method is changed. As the methods with a low arithmetic operation amount for integrating a plurality of pattern recognition results, there are integration methods 1, 2, and 3 as follows.
Integration method 1: Employs majority rule on each of the partial recognition results.
Integration method 2: Finds total score based on the maximum value of each of partial recognition scores.
Integration method 3: Finds total score based on a product of occurrence probabilities of a recognition object category in each of the partial regions.
Integration method 4: Finds total score based on a product of occurrence probabilities of a partial recognition score.

It is widely known in the field of pattern recognition that the integration method 1 is an effective method. However, in a case of recognizing an object having partial concealment, this method is not capable of achieving recognition correctly if the number of regions with the concealment is more than a half of the number of all regions. In the meantime, the integration method 2 uses the maximum value of each partial recognition score, so that it is easier to make misrecognition when only one of the partial regions accidentally becomes likely to be the recognition object category. In the meantime, the integration method 3 can find the total score with a guarantee in terms of a probability theory, if each partial region is statistically independent. However, the integration method 3 is not designed by considering occurrence of partial concealment, so that the recognition score becomes deteriorated extremely only if there is concealment in a small number of areas. Note that one instance that utilizes the integration method 3 is depicted in an expression (1) of Non-Patent Document 3. In the meantime, the integration method 4 is a method which, when performing recognition based on Bayes' formula as shown in an expression (2) of Patent Document 1, calculates the total score based on the product of the occurrence probabilities of the partial recognition scores under a condition that it is the recognition object category as shown in an expression (3) of Patent Document 1. If a priori probability P (ki) in expression (2) of Patent Document 1 can be assumed to be the same for a recognition object category and a non-recognition object category, the integration method 4 becomes equivalent to the integration method 3.

"Category" is a term used in the field of pattern recognition, which indicates a classification of patterns. It may also be called a class. This is equivalent to a "kind" or a "group" in general terms. For example, when an image is classified depending on whether it is an automobile or not an automobile, "is an automobile" and "is not an automobile" are the two categories. Further, in a case with "is a child", "is an adult", "is an elderly person", and "is not a human being", there are four categories. As in those cases, the categories may be set in accordance with the content to be recognized. "Pattern" indicates various kinds of data such as images, sounds, and characters.

Patent Document 1: Japanese Unexamined Patent Publication 2001-283157
Non-Patent Document 1: Akira INOUE, "Face Recognition Using Local Area Matching", Proceedings of 2003 IEICE General Conference, No. D-12-57, March 2003
Non-Patent Document 2: Takashi TAKAHASHI, Takio KURITA, Yukifumi IKEDA, "A Neural Network Classifier with Preprocessing to Correct Outliers in an Image" IEICE Transactions, Vol. J87-DII No. 5, pp. 1162-1169, 2004
Non-Patent Document 3: Akira MONDEN, Seiji YOSHIMOTO, "Similarity based on probability that two fingers have no correlation", Technical Report of IEICE, Vol. 101 No. 525, pp. 53-58, December 2001

DISCLOSURE OF THE INVENTION

Problems to be Solved by the Invention

A first issue of the object recognition system described above is as follows. That is, even though it is true that a high object recognition rate can be achieved with the object recognition method that depends on appearance of the picked-up image of the object, the recognition rate becomes greatly deteriorated if there is simply partial concealment.

The reason is that an "appearance" that is not of the target object is observed with the recognition based on the "appearance" due to partial concealment, so that the recognition rate is greatly deteriorated by that influence.

A second issue is as follows. That is, with the recognition method corresponding to the partial concealment, it is not possible to perform recognition when the amount of calculations is large or the concealed area is large, or, it is difficult to deal with a case where a noise similar to the target object is generated only in one part.

The reason is that the amount of calculations for judging the concealed part is great with the method which eliminates the concealed part from the recognition calculating processing. Further, with the method which performs recognition by dividing the area into partial regions and integrates the results of each partial region, it is not possible to deal with a case where the concealed region is large when integration is performed with a majority rule. Further, this method may perform misrecognition in a case where the score of one region is accidentally high when integration is performed based on the maximum partial recognition scores. In the meantime, when performing integration of N-pieces of large partial recognition scores, it is necessary to determine the value of N in advance.

An object of the present invention is to provide an object recognition system, an object recognition method, and an object recognition program, which can keep a high recognition rate even if there is partial concealment in the object.

Means for Solving the Problems

The object recognition system according to the present invention is a system for recognizing a category of an object based on an image of the object, which includes:
  a partial feature amount acquisition device which acquires a feature amount of a partial region of the image;
  a partial recognition device which recognizes the category in the partial region and obtains a partial recognition score;
  an occurrence probability calculation device which calculates an estimated value of an occurrence probability of the partial recognition score under a condition of being a recognition object category;
  a total score calculation device which calculates a total score based on nonoccurrence probabilities of the partial recognition scores of a plurality of the partial regions under the condition of being the recognition object category; and
  a result judgment device which judges the category of the object based on the total score.

The object recognition method according to the present invention is a method for recognizing a category of an object based on an image of the object, which includes:
  executing, for each of the partial regions of the image, processing for acquiring a feature amount of a partial region of the image, processing for recognizing the category in the partial region and obtaining a partial recognition score, and processing for calculating an estimated value of an occurrence probability of the partial recognition score under a condition of being a recognition object category;
  calculating a total score based on nonoccurrence probabilities of the partial recognition scores of a plurality of the partial regions under the condition of being the recognition object category; and
  judging the category of the object based on the total score.

The object recognition program according to the present invention is a program for recognizing a category of an object based on an image of the object, which enables a computer to execute:
  partial feature amount acquiring processing for acquiring a feature amount of a partial region of the image;
  partial recognition processing for recognizing the category in the partial region and obtaining a partial recognition score;
  occurrence probability calculation processing for calculating an estimated value of an occurrence probability of the partial recognition score under a condition of being a recognition object category;
  total score calculation processing for calculating a total score based on nonoccurrence probabilities of the partial recognition scores of a plurality of the partial regions under the condition of being the recognition object category; and
  result judgment processing for judging the category of the object based on the total score.

Effects of the Invention

A first effect of the present invention is that it is capable of keeping the high recognition rate even if there is partial concealment.

The reason is that the present invention is designed to perform recognition by each partial region, and to calculate the total score by suppressing the influence of the partial region with concealment.

A second effect thereof is that the present invention does not require a large amount of calculations, is capable of performing recognition even if the concealed area is large, and may be able to properly discard a noise if such noise likely to be a recognition object category is generated only in one part.

The reason is as follows. That is, the present invention is capable of calculating the total score with the same number of multiplications as the number of the partial regions through calculating the total score based on the product of probabilities of nonoccurrence of the partial recognition score that is calculated based on the partial regions. In addition, when there are partial regions having no concealment, even if the number of them is small, it is possible to obtain a higher total score than the case of relatively lower score as a whole can be obtained. Thereby, it is easier with the present invention to correspond to the condition with a noise by adjusting a threshold value.

BEST MODES FOR CARRYING OUT THE INVENTION

Next, exemplary embodiments of the invention will be described in detail.

Referring to FIG. 1, an object recognition system 10 according to a first exemplary embodiment of the invention is configured with a data processor 100 operated by controls of a program, and a storage device 200.

The data processor 100 includes a partial feature amount acquisition device 110, a partial recognition device 120, an occurrence probability calculation device 130, a total score calculation device 140, and a result judgment device 150. The storage device 200 includes an identification parameter storage section 210 and an occurrence probability estimation parameter storage section 220.

Each of the storage sections holds data roughly as follows. The identification parameter storage section 210 holds a parameter for finding, by the partial recognition device 120, partial recognition score which shows whether or not the partial feature amount is a specific category, i.e., shows likeliness of the recognition object category.

The occurrence probability estimation parameter storage section 220 holds a parameter for estimating the occurrence probability of the partial recognition score under a condition of being a recognition object category based on the partial recognition scores of the partial regions obtained by the partial recognition device 120.

Each of the devices operates roughly as follows. The partial feature amount acquisition device 110 acquires the feature amount for identifying whether or not the partial region of an object is the recognition target category. The partial region means an area which is not the entire object on an image but a part of the object. The partial feature amount to be acquired may be any data obtained from "image". Specific examples thereof may be luminance data of an image, luminance histogram data of an image, gradient information data extracted from an image, frequency data extracted from an image, data obtained by extracting differential information regarding a plurality of images, or a combination of those.

The partial recognition device 120 identifies whether or not the partial region corresponding to the feature amount acquired by the partial feature amount acquisition device 110 is the partial region of the recognition object category according to the parameter stored in the identification parameter storage section 210. As the identification result of the partial region, the partial recognition score of the recognition object category is outputted. As an identification method executed by the partial recognition device 120, a statistical pattern recognition method may be used. For example, perceptron as a kind of neural network, support vector machine, maximum likelihood estimation, Bayes' estimation, learning vector quantization, a subspace method, or the like may be used.

The parameter that is saved in advance in the identification parameter storage section 210 is a parameter required for recognizing the partial regions. When performing recognition (identification) with the learning vector quantization, learned reference vectors are stored.

From the partial recognition scores calculated by the partial recognition device 120, the occurrence probability calculation device 130 calculates an estimated value of the occurrence probability of the partial recognition score under the condition of being the recognition object category according to the parameter stored in the occurrence probability estimation parameter storage section 220. As a method for such occurrence probability estimation, it is possible to put the occurrence probability into a model in advance as a function of the partial recognition score including the occurrence probability estimation parameter, and to find the occurrence probability from the partial recognition score. Alternatively, a conversion table for converting the partial recognition score to the occurrence probability may be used as well.

The total score calculation device 140 calculates the total score for judging whether or not the object is the recognition object category by calculating the product of the "nonoccurrence" probabilities of the feature amount under the condition of being the recognition object category based on a group of numerical values of the occurrence probabilities obtained respectively for a plurality of partial regions. The nonoccurrence probability can be obtained by subtracting the occurrence probability from 1.0. A following Expression 1 shows a numerical formula for obtaining the nonoccurrence probability. Note here that $S_i$ is a partial recognition score of a partial region i (i is an integer that is equal to or larger than 1 and equal to or smaller than the number of the partial regions), $\omega_c$ is a recognition object category, and $p(S_i|\omega_c)$ is an occurrence probability of $S_i$ under a condition of being $\omega_c$.

[Expression 1]

$$S(\omega_c) = 1 - p(S_i, \omega_c) \qquad \text{Numerical formula 1}$$

The result judgment device 150 makes judgment regarding whether or not the object is the recognition object category based on the total score calculated by the total score calculation device 140. As a judging method, it is possible to make judgment by performing threshold-value processing by using a threshold value that is set in advance.

Next, the entire operations of the exemplary embodiment will be described in detail by referring to FIG. 1 and a flowchart of FIG. 2.

First, the partial feature amount acquisition device 110 extracts a feature amount of a partial region that corresponds to a part of an object upon receiving an input of an image of the object (step S110 of FIG. 2). Then, upon receiving an input of the extracted feature amount of the partial region, the partial recognition device 120 identifies whether or not the partial region is a partial region of a recognition object category, and finds a recognition score (partial recognition score) of the partial region (step S120). In this step S120, identification is conducted based on the parameter held in the identification parameter storage section 210.

Further, upon receiving an input of the partial recognition score obtained in step S120, the occurrence probability calculation device 130 estimates the occurrence probability of the partial recognition score in the partial region under the condition of being the object target category (step S130). In this step S130, the estimated value of the occurrence probability is calculated based on the parameter stored in the occurrence probability estimation parameter storage section 220. Such processing from step S110 to step S130 is repeatedly executed for a plurality of partial regions (step S140).

FIG. 3 and FIG. 4 are conceptual diagrams showing a state of obtaining the partial recognition scores of each partial region and the numerical value of the occurrence probability through the repeated processing. In an image 20 of FIG. 3, M-number of (M=9 in this case) partial regions 21 are set. First, the partial recognition score "$S_i = S_i(\omega_c|x_i)$" is obtained for each partial region 21. Then, the occurrence probability "$P(S_i|\omega_c)$" is obtained based on Si of each partial region 20 as shown in FIG. 4.

In FIG. 2, the total score calculation device 140 calculates the total score by using the occurrence probabilities obtained respectively for a plurality of partial regions (step S150). The total score calculation device 140 calculates the total score based on the product of the probabilities expressed by Expression 1, i.e., the product of the "nonoccurrence" probabilities of the partial recognition score in each of the partial regions under the condition of being the recognition object category. As a calculation formula of such total score, following Expression 2 may be used. There is a negative sign in the head of the right side of Expression 2 in order to adjust the total score in such a manner that it becomes higher as the likeliness of the recognition object category becomes higher.

[Expression 2]

$$S(\omega_c) = -\prod_i \{1 - p(S_i | \omega_c)\} \qquad \text{Numerical Formula 2}$$

At last, the result judgment device 150 judges whether or not the inputted object image is the recognition object category through performing threshold-value processing on the total score value that is calculated in step S150 (step S160).

Next, effects of the exemplary embodiment will be described. This exemplary embodiment is structured to include the total score calculation device which performs calculations based on the product of the values calculated with Expression 1, i.e., the product of the "nonoccurrence" probabilities of the partial recognition score in each of the partial regions under the condition of being the recognition object category. Thus, even in a case of an object image with partial concealment, it is possible to recognize whether or not the object image is the recognition object category. In addition, the exemplary embodiment further takes the value calculated with Expression 2 as the total score, it is possible to obtain the total score by conducting only the same number of multiplications as the number of partial regions. Furthermore, it is possible to perform recognition even if the concealed region is large. Moreover, there is a possibility of correctly discarding a noise, when such noise similar to the object target is generated only in one part.

Next, the reasons for being able to achieve the effects of the exemplary embodiment will be described by referring to a specific example. FIG. 5 shows examples of the occurrence probabilities obtained when the number of the partial regions is "5", and the values of the total scores calculated from the occurrence probabilities. A second column of the table shows the occurrence probabilities of each of the partial regions, in which the larger numerical value means that the partial region thereof is more likely to the recognition object category. A third column of the table shows the total scores obtained by the product of "occurrence" probabilities of the partial recognition scores, and a fourth column of the table shows the total scores based on the product of "nonoccurrence" probabilities of the partial recognition scores, i.e., the fourth column shows the total scores obtained according to the exemplary embodiment.

An instance 1 is a case where there is no concealment, an instance 2 is a case where one partial region is concealed, an instance 3 is a case where two partial regions are concealed, an instance 4 is a case where it is almost likely to be the recognition object category as a whole while there is no concealment, an instance 5 is a case where most of the partial regions are concealed, and an instance 6 is a case where it is almost unlikely to the recognition object category as a whole. Considering the object of the present invention, "to correctly recognize the object image that may have partial concealment", the instances 1, 2, and 3 have to be judged clearly as the recognition object category, and the instance 6 has to be judged not as the recognition object category. In the meantime, it is considered almost appropriate to judge that the instances 4 and 5 are almost likely to be the recognition object category.

First, described is a case where the concealed area in the object image is relatively narrow. When the product of the "occurrence" probabilities is used for the total score, the score in the instance 2 is radically decreased compared to that of the instance 1, which is the value lower than that of the instance 4 that cannot clearly be judged as being the recognition object category. However, with the exemplary embodiment, a higher total score than that of the instance 4 can be obtained in the instance 2. This is a case which shows that it is possible with the exemplary embodiment to "correctly recognize whether or not the object image with a small concealed area is the recognition object category".

Then, there is described a case where the concealed area in the object image is relatively wide. When the product of the "occurrence" probabilities is used for the total score, the score in the instance 5 is decreased compared to that of the instance 6. Thus, even if the threshold value is adjusted, it is not possible to correctly judge the instance 5 as the recognition object category and the instance 6 not as the recognition object category. In the meantime, with the exemplary embodiment, it is possible to correctly make judgment when the threshold value is adjusted (for example, the threshold value is set as −0.07). This is a case which shows that it is possible with the exemplary embodiment to "correctly recognize whether or not the object image with a large concealed area is the recognition object category".

Incidentally, in a case of the occurrence probability of the instance 5, there may be an occasion where a noise similar to the recognition object category is generated accidentally in one of the partial regions even though it is not actually a recognition object category. In that case, it becomes possible to judge such instance as not being the recognition object category through adjusting the threshold value of the total score in advance (for example, the threshold value is set as −0.06).

Even when the data inputted to the partial feature amount acquisition device 110 is not the object image itself but the feature amount that has been already converted from the object image, the same effect can be obtained if the partial feature amount acquisition device 110 can convert it to the feature amounts of each of the partial regions.

In the meantime, regarding the way of setting the partial regions, the same effects can be obtained through dividing the object image into an arbitrary plural numbers of partial regions. For example, the partial regions may be set to be uniform square regions 22 as illustrated in FIG. 6A, set to be in partial regions 23, 24, and 25 of nonuniform areas as illustrated in FIG. 6B, or may be set in such a manner that those regions overlap on each other on an image plane.

Further, completely the same effect can be obtained even when the repeated operations in step S140 are executed by repeatedly performing each of steps S110, S120, and S130 individually.

It is also possible to obtain a completely equivalent recognition performance by adding a constant term to the right side of Numerical formula 2. For example when "1" is added as a constant term, the value of the total score can be set to be within 0 to 1.

In the meantime, regarding the method for calculating the total score, it is also possible to achieve a completely equivalent recognition performance through adjusting the threshold value of the total score by obtaining the sum total of logarithms of the nonoccurrence probabilities as in Expression 3 but not by calculating the total product of the nonoccurrence probabilities as in Expression 2.

[Expression 3]

$$S(\omega_c) = -\sum_i \{\log(1 - p(S_i | \omega_c))\} \qquad \text{Numerical formula 3}$$

Not only that, as in the case of the total product, it is possible to obtain an almost equivalent recognition performance by calculating the total score through utilizing a mathematical function with which a high score can be obtained even when only a part of the nonoccurrence probabilities is high.

In the meantime, as depicted in a section of BACKGROUND ART of this Specification, when it is assumed that a priori probability of Bayes' formula is the same for a recognition object category and a nonrecognition object category, not the "occurrence probability of the partial recognition score" but the "occurrence probability of the recognition object category in the partial regions" is obtained by the occurrence probability calculation device 130 in the occurrence probability calculation step S130. Further, the total score is calculated by the total score calculation device 140 in the total score calculation step S150 based on the "nonoccurrence probability of the recognition object category in the partial regions". With this, the same effect can be obtained.

Incidentally, when the inputted object image has a missing part, it is not possible with the partial feature amount acquisition device 110 to acquire the partial feature amount. In such case, provided that the number of observable partial regions is a variable "m", the sum total of the logarithms of the nonoccurrence probabilities is divided by "m" as in following Numerical formula 4. Thereby, the threshold-value processing of the total score can be performed with a specific threshold value which does not depend on the number of partial regions.

[Expression 4]

$$S(\omega_c) = -\frac{\sum_{i=1}^{m} \log(1 - p(S_i \mid \omega_c))}{m}$$

Numerical formula 4

In the meantime, in a case where the total score is obtained with Numerical Expression 4, the total score can be calculated at a point where step S110, S120, and S130 are executed not for all the partial region but for a part thereof, since the number of "m" is variable. Therefore, if a higher total score than a given threshold value can be obtained by performing the threshold-value processing on the total score obtained from only a part of the partial regions, it is possible to output it as a final recognition result by omitting the processing on the remaining partial regions.

Next, an object recognition system 11 according to a second exemplary embodiment of the invention will be described in detail by referring to the drawings. This exemplary embodiment can deal with a case where there are not two but three or more categories for identifying the object. In the followings, same reference numerals as those of FIG. 1 are applied to the structural elements that are common to those of the object recognition system 10, and explanations thereof are omitted.

FIG. 7 is a block diagram of the object recognition system 11. This exemplary embodiment employs the same structure as that of the object recognition system 10 of FIG. 1. However, flows of the processing as well as the contents stored in the identification parameter storage section 210 and the occurrence probability estimation parameter storage section 220 are different. In this exemplary embodiment, the parameters held in the identification parameter storage section 210 are not the parameters for a single category but also parameters for the number of categories. Further, the parameters held in the occurrence probability estimation parameter storage section 220 are also the parameters for the number of categories.

Next, entire operations of the exemplary embodiment will be described by referring to flowcharts of FIG. 2, FIG. 7, and FIG. 8. In the followings, explanations will be provided while assuming that the number of categories is "N".

Whether or not the object is the first category, i.e., whether or not the object is a first recognition object category, is identified by the operations from step S110 to step S150 of FIG. 2 by using the partial feature amount acquisition device 110, the partial recognition device 120, the occurrence probability calculation device 130, the total score calculation device 140, and the result judgment device 150 (step S210 of FIG. 8). When judged that it is the first category as a result of identification, the processing is ended by deciding the final result as being the first category. When judged that it is not the first category, the processing returns to a step for identifying the second category (step S220).

The identifying step S210 is repeatedly executed in this manner up to the (N−1)-th category at the most so as to judge the category of the object.

Next, effects of the exemplary embodiment will be described. In addition to achieving the same effects as those of the first exemplary embodiment, it is possible with the second exemplary embodiment to perform identification correctly even when there are three or more categories.

Now, a specific example regarding the first exemplary embodiment of the invention will be described as a third exemplary embodiment.

In the third exemplary embodiment, a case of recognizing whether or not the object is a human being is described. The third exemplary embodiment uses "generalized learning vector quantization" as a recognition method of the partial regions. Further, used for calculating the estimated value of the occurrence probability is a conversion table which relates the partial recognition scores of the partial regions with the estimated values of the occurrence probabilities on one on one basis. In such case, "reference vector" necessary for executing identification in "generalized learning vector quantization" is saved in advance in the identification parameter storage section 210 as the parameter. Further, the conversion table for converting the partial recognition scores of the partial regions into the occurrence probabilities is saved in advance in the occurrence probability estimation parameter storage section 220 as the parameter.

In FIG. 1, the third exemplary embodiment uses a personal computer as the data processor 100 and uses a semiconductor memory as the storage device 200. In this case, the identification parameter storage section 210 and the occurrence probability estimation parameter storage section 220 can be considered as a part of the semiconductor memory. In the meantime, the partial feature amount acquisition device 110, the partial recognition device 120, the occurrence probability calculation device 130, the total score calculation device 140, and the result judgment device 150 can be achieved on a CPU of the personal computer.

Next, operations of the third exemplary embodiment will be described. First, the partial feature amount acquisition device 110 executes the operation which corresponds to step S110 of FIG. 2. In this step, the partial feature amount acquisition device 110 inputs an image of the object that is to be recognized, sets partial regions as in FIG. 6A after extracting edges from the image, and extracts the feature amount of one partial region as the feature extraction processing. At this time, it is also possible to execute edge extraction processing after extracting the partial region as an image.

Next, the partial recognition device 120 executes the operation which corresponds to step S120 of FIG. 2. In this step, the partial recognition device 120 performs processing for identifying whether or not the partial region is a recognition object category (human being) based on the "generalized learning vector quantization", and calculates the partial recognition score.

Then, the occurrence probability calculation device 130 executes the operation which corresponds to step S130 of FIG. 2. In this step, the occurrence probability calculation device 130 calculates the probability of having the partial recognition scored obtained under a condition of being a human being occurring in the partial region based on the conversion table. Then, the processing up to this is repeatedly executed for all the partial regions. Based on the execution result, the total score calculation device 140 calculates the occurrence probabilities for the number of the partial regions based on the execution results (step S140 of FIG. 2).

Then, the result judgment device 150 executes the operation which corresponds to step S150 of FIG. 2 and calculates the total score. In this step, the result judgment device 150 may calculate the total score with a numerical formula which is based on the nonoccurrence probability that is shown with Numerical formula 4. Thereafter, the result judgment device 150 judges whether or not the object is a human being by executing the operation which corresponds to step S160 of FIG. 2 to perform the threshold-value processing on the total score.

Next, a specific example regarding the second exemplary embodiment of the invention will be described as a fourth exemplary embodiment. In the fourth exemplary embodiment, described is a case in which the object is recognized whether it is "a human being", "an automobile" or "neither a human being nor an automobile".

As in the case of the third exemplary embodiment, the partial recognition device 120 in the fourth exemplary embodiment uses the "generalized learning vector quantization" as a partial region recognition method, and the occurrence probability calculation device 130 utilizes the conversion table which relates the partial recognition scores of the partial region with the estimated values of the occurrence probabilities on one on one basis for calculating the estimated values of the occurrence probabilities. In such case, the "reference vector" for making judgments on being a human being and the "reference vector" for identifying as being an automobile required for executing identification with the "generalization learning vector quantization" are saved in advance in the identification parameter storage section 210 as the parameters. Further, a conversion table for a human being and a conversion table for an automobile used for converting partial recognition scores of the partial region into the occurrence probabilities are saved in advance in the occurrence probability estimation parameter storage section 220 as the parameters.

As in the case of the third exemplary embodiment, for the hardware structure to be used, a personal computer may be used as the data processor 100, and a semiconductor memory may be used as the storage device 200.

Next, operations of the fourth exemplary embodiment will be described. The partial feature amount acquisition device 110, the partial recognition device 120, the occurrence probability calculation device 130, the total score calculation device 140, and the result judgment device 150 are used to execute the operation corresponding to step S210 of FIG. 8. In this step, it is judged whether or not the object is a human being by executing the same operation as that of the third exemplary embodiment.

Then, as the operation corresponding to step S220, the result judgment device 150 decides the final recognition result as "a human being" and ends the processing when the object is judged as a human being. If not, the result judgment device 150 returns to step S210 and judges whether or not the object is an automobile. Then, the result judgment device 150 decides the final recognition result as "an automobile" and ends the processing when the object is judged as an automobile. If not, the result judgment device 150 decides the recognition result as "something that is neither a human being nor an automobile".

An object recognition system according to another exemplary embodiment of the invention is a system which judges whether or not an object is a recognition object category based on a picked up image of the object, which may be configured as a structure having a data processor (100) and a storage device (200). The data processor may include: a partial feature amount acquisition device (110) which acquires a feature amount corresponding to a part of the object; a partial recognition device (120) which finds a partial recognition score by executing identification of the feature amount; an occurrence probability calculation device (130) which estimates the occurrence probability of the partial recognition score under a condition of being a recognition object category; a total score calculation device (140) which calculates the total score based on "nonoccurrence probability" of the partial recognition score under the condition of being the recognition object category; and a result judgment device (150) which judges the identification result based on the total score. The storage device may include an identification parameter storage section (210) which stores the parameter for identifying the partial regions and an occurrence probability estimation parameter storage section 220 which stores the parameter for estimating the occurrence probabilities from the identification results of the partial regions.

The object recognition system according to another exemplary embodiment of the invention operates as follows. First, a feature amount of a partial region is acquired from an object image by the partial feature amount acquisition device (S110), the partial recognition score of the acquired partial region is obtained by the partial recognition device based on the identification parameter, and the occurrence probability of the partial recognition score under a condition of being a recognition object category is calculated by the occurrence probability calculation device based on the partial recognition score of the partial region (S130). Then, the processing from (S110) to (S130) is repeated for all the partial regions to obtain the occurrence probabilities of each region (S140). Thereafter, the total score is calculated by the total score calculation device based on the "nonoccurrence" probabilities of the partial recognition scores under the condition of being the recognition object category (S150). Then, it is judged whether or not the object is the recognition object category by using the result judgment device based on the total score (S160).

Through employing such configuration and executing the operations in the manner described above, the object of the present invention can be achieved.

As in the case of the object recognition system described above, it is also possible to achieve the object of the present invention in the same manner with an object recognition method and an object recognition program according to other exemplary embodiments of the invention.

While the present invention has been described by referring to the embodiments (and examples), the present invention is not limited only to those embodiments (and examples) described above. Various kinds of modifications that occur to those skilled in the art can be applied to the structures and details of the present invention within the scope of the present invention.

This Application claims the Priority right based on Japanese Patent Application No. 2007-101904 filed on Apr. 9, 2007, and the disclosure thereof is hereby incorporated by reference in its entirety.

INDUSTRIAL APPLICABILITY

The present invention can be applied and used for object surveillances, e.g., detection of a prescribed object such as a human being or an automobile from a moving image picked up by a camera even if there is concealment of some extent.

Further, the present invention can also be applied and used for recognizing the kinds of the objects in a picture and for automatically classifying those even if there is concealment of some extent.

BRIEF DESCRIPTION OF THE DRAWINGS

FIG. 4 is a conceptual diagram for describing the operations of the first exemplary embodiment of the invention;

FIG. 5 is a table for describing operations of a second exemplary embodiment of the invention;

Figure 1:
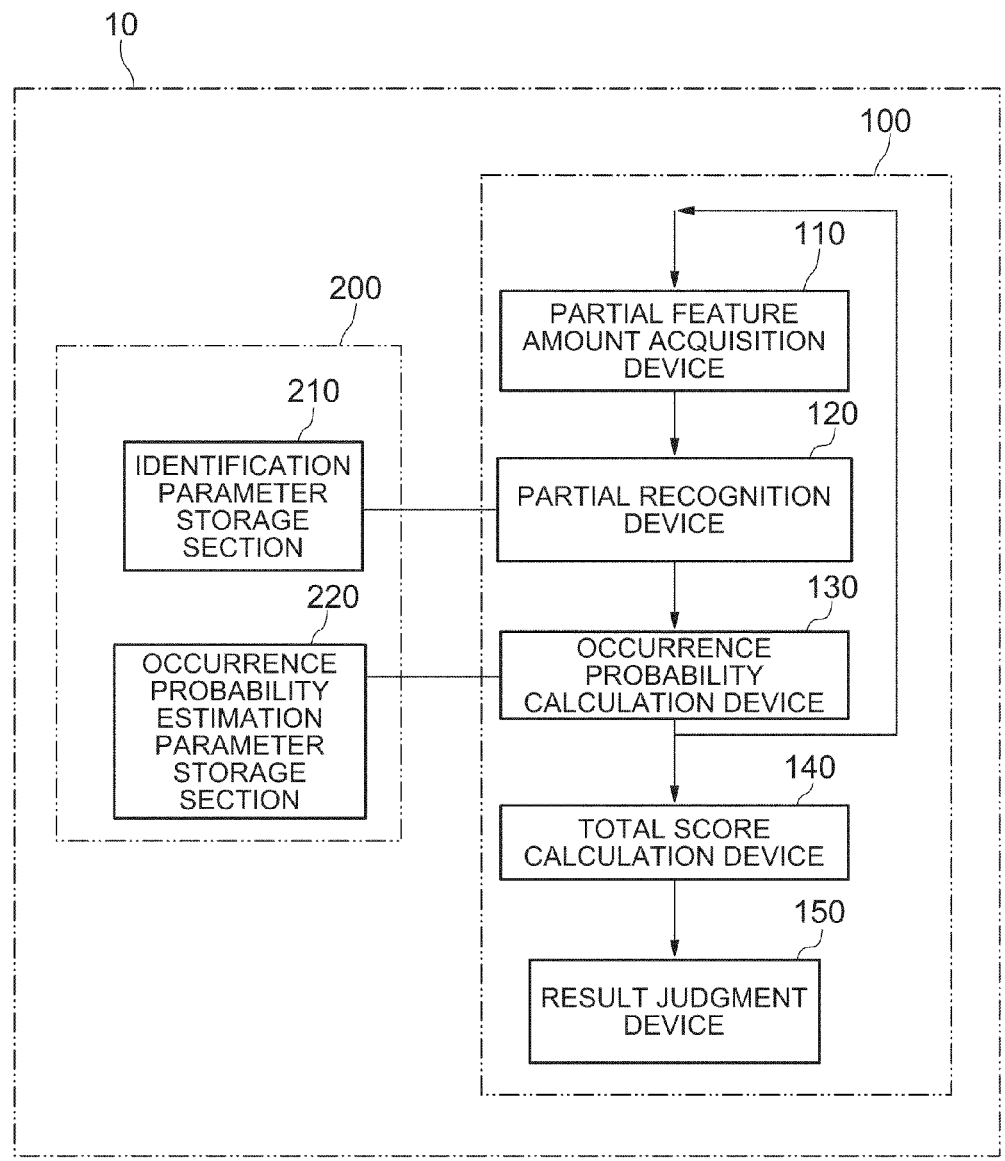
FIG. 1 is a block diagram showing the structure of a first exemplary embodiment of the invention.
Figure 2:
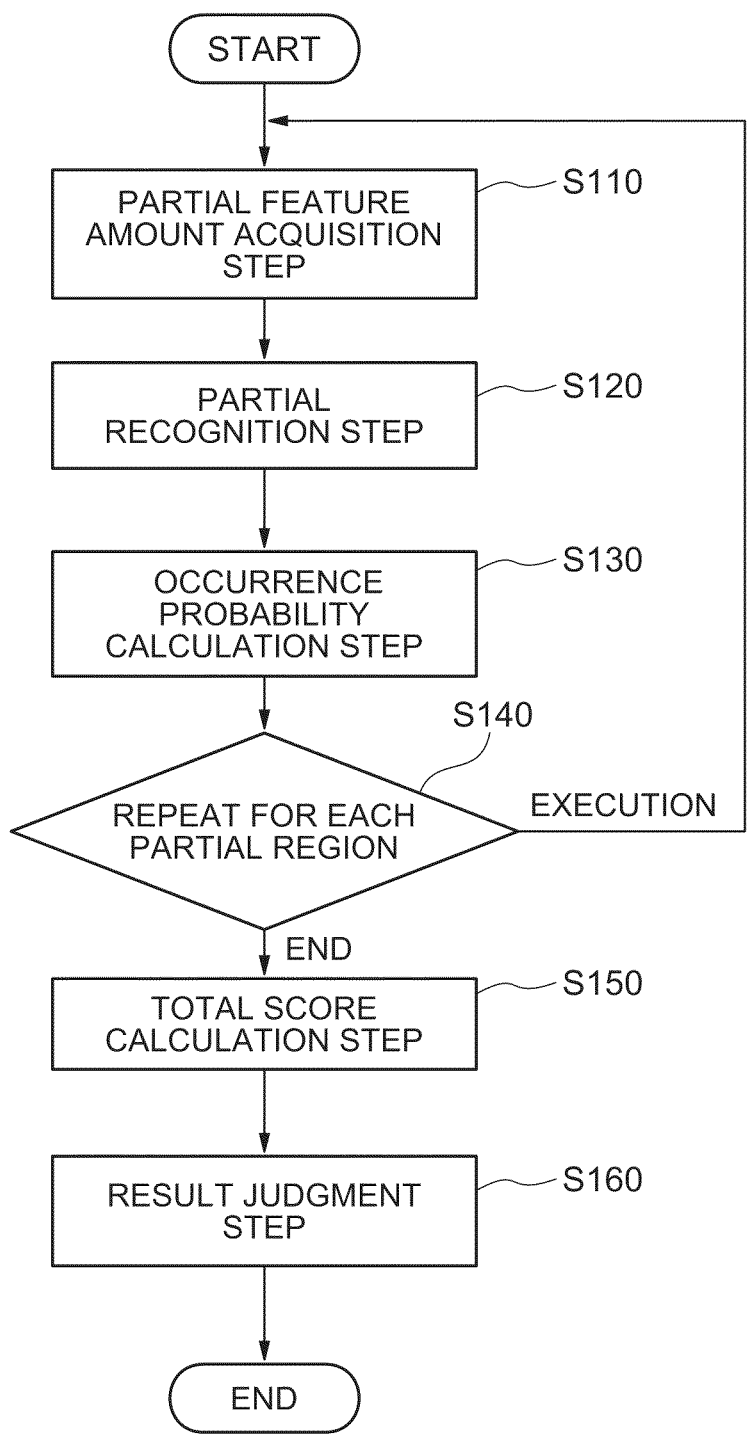
FIG. 2 is a flowchart showing operations of the exemplary embodiment of the invention.
Figure 3:
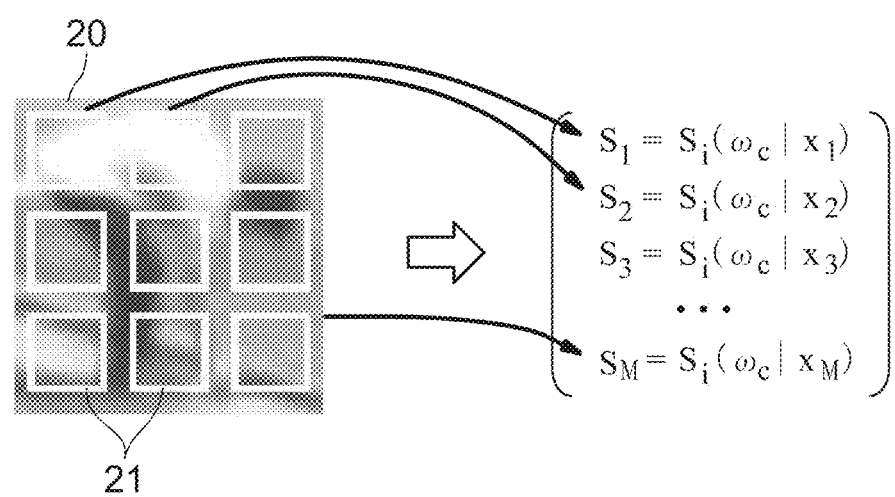
FIG. 3 is a conceptual diagram for describing the operations of the first exemplary embodiment of the invention.
Figure 6A:
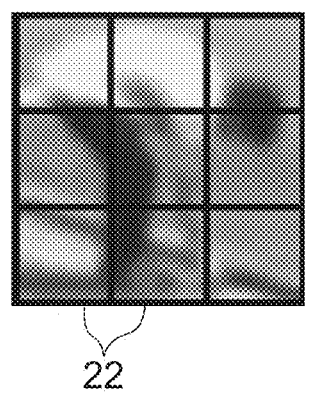
FIG. 6 shows illustrations for describing specific examples of partial regions set in object images with the third exemplary embodiment of the invention.
Figure 6B:
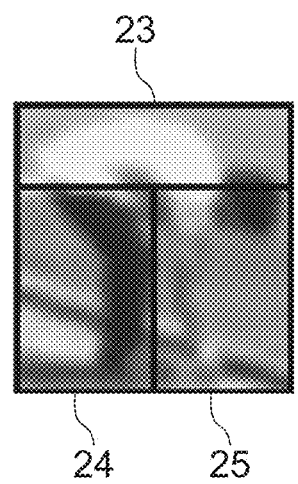
Figure 7:
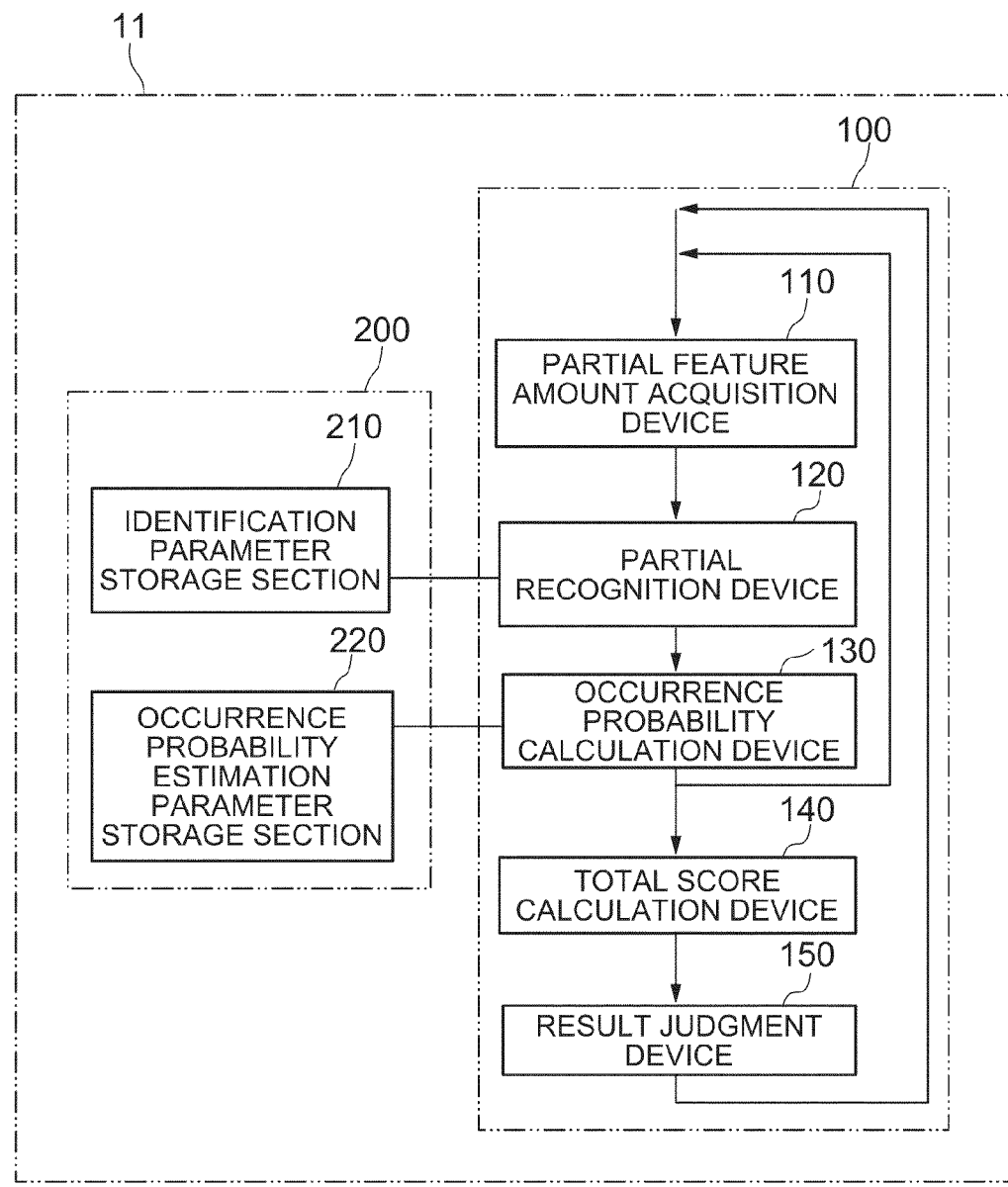
FIG. 7 is a block diagram showing the structure of a fourth exemplary embodiment according to the invention.
Figure 8:
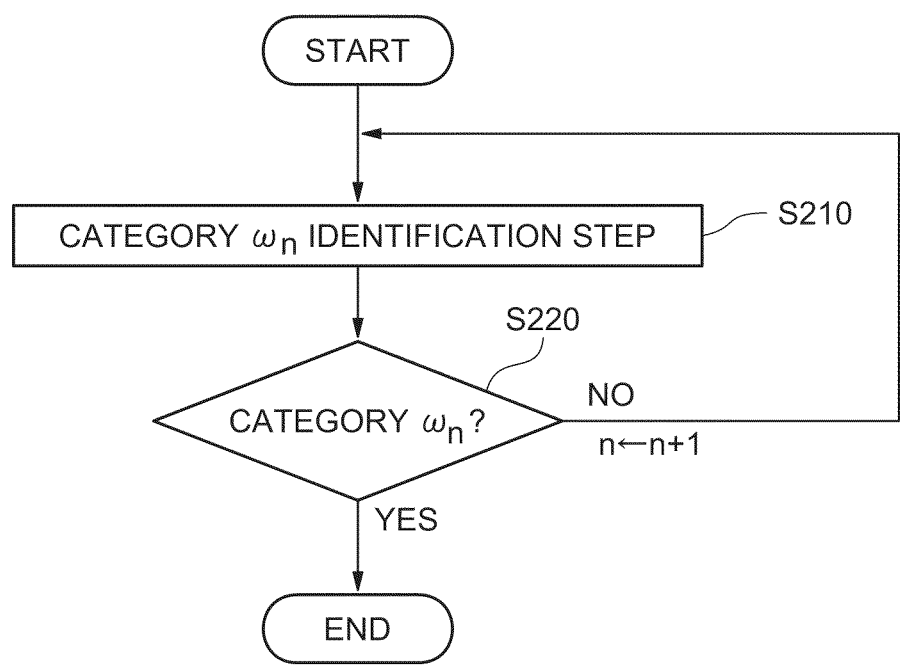
FIG. 8 is a flowchart for describing operations of the fourth exemplary embodiment of the invention.

REFERENCE NUMERALS 10, 11 Object recognition system
100 Data processor
110 Partial feature amount acquisition device
120 Partial recognition device
130 Occurrence probability calculation device
140 Total score calculation device
150 Result judgment device
200 Storage device
210 Identification parameter storage section
220 Occurrence probability estimation parameter storage section

The invention claimed is:

1. An object recognition system for recognizing a category of an object based on an image of the object, comprising:
a partial feature amount acquisition device which acquires a feature amount of a partial region of the image;
a partial recognition device which recognizes the category in the partial region and obtains a partial recognition score;
an occurrence probability calculation device which calculates an estimated value of an occurrence probability of the partial recognition score under a condition of being a recognition object category;
a total score calculation device which calculates a total score based on nonoccurrence probabilities of the partial recognition scores of a plurality of the partial regions under the condition of being the recognition object category; and
a result judgment device which judges the category of the object based on the total score,
wherein the total score calculation device calculates the total score according to a numerical formula including a sum total of logarithms of the nonoccurrence probabilities of the partial recognition scores.

2. The object recognition system as claimed in claim 1, wherein: the total score is obtained by the total score calculation device and the result judgment device at a point where the partial feature amount acquisition device, the partial recognition device, and the occurrence probability calculation device are operated for only a part of the partial regions; and the category is taken as a recognition result when the total score shows a value likely to be the recognition object category.

3. The object recognition system as claimed in claim 1, wherein, when judged that the object is not a certain recognition object category, the result judgment device performs an operation for recognizing whether or not the object is another recognition object category.

4. The object recognition system as claimed in claim 1, wherein: the occurrence probability calculation device calculates the estimated value of the occurrence probability of the partial recognition score under the condition of being the recognition object category; and the total score calculation device calculates the total score based on the nonoccurrence probabilities of the recognition object category in the partial regions.

5. An object recognition system for recognizing a category of an object based on an image of the object, comprising:
a partial feature amount acquisition device which acquires a feature amount of a partial region of the image;
a partial recognition device which recognizes the category in the partial region and obtains a partial recognition score;
an occurrence probability calculation device which calculates an estimated value of an occurrence probability of the partial recognition score under a condition of being a recognition object category;
a total score calculation device which calculates a total score based on nonoccurrence probabilities of the partial recognition scores of a plurality of the partial regions under the condition of being the recognition object category; and
a result judgment device which judges the category of the object based on the total score,
wherein the total score calculation device calculates the total score according to a numerical formula including an operation which divides a sum total of logarithms of the nonoccurrence probabilities of the partial recognition scores by a number of the partial regions.

6. The object recognition system as claimed in claim 5, wherein: the total score is obtained by the total score calculation device and the result judgment device at a point where the partial feature amount acquisition device, the partial recognition device, and the occurrence probability calculation device are operated for only a part of the partial regions; the category is taken as a recognition result when the total score shows a value likely to be the recognition object category; and processing for remaining partial regions is omitted.

7. The object recognition system as claimed in claim 5, wherein: the total score is obtained by the total score calculation device and the result judgment device at a point where the partial feature amount acquisition device, the partial recognition device, and the occurrence probability calculation device are operated for only a part of the partial regions; and the category is taken as a recognition result when the total score shows a value likely to be the recognition object category.

8. The object recognition system as claimed in claim 5, wherein, when judged that the object is not a certain recognition object category, the result judgment device performs an operation for recognizing whether or not the object is another recognition object category.

9. The object recognition system as claimed in claim 5, wherein: when it is assumed that a priori probability of Bayes' formula is the same for a recognition object category and a nonrecognition category, the occurrence probability calculation device calculates the estimated value of the occurrence probability of the recognition object category in the partial region instead of the occurrence probability of the partial recognition score under the condition of being the recognition object category; and the total score calculation device calculates the total score based on the nonoccurrence probabilities of the recognition object category in the partial regions.

10. An object recognition method for recognizing a category of an object based on an image of the object, comprising:
    executing, for each of the partial regions of the image, processing for acquiring a feature amount of a partial region of the image, processing for recognizing the category in the partial region and obtaining a partial recognition score, and processing for calculating an estimated value of an occurrence probability of the partial recognition score under a condition of being a recognition object category;
    calculating a total score based on nonoccurrence probabilities of the partial recognition scores of a plurality of the partial regions under the condition of being the recognition object category; and
    judging the category of the object based on the total score, wherein, when calculating the total score, the total score is calculated according to a numerical formula including a sum total of logarithms of the nonoccurrence probabilities of the partial recognition scores.

11. The object recognition method as claimed in claim 10, wherein, when calculating the total score, the total score is calculated according to a numerical formula including an operation which divides a sum total of logarithms of the nonoccurrence probabilities of the partial recognition scores by a number of the partial regions.

12. The object recognition method as claimed in claim 11, wherein: the total score calculation step and the result judgment step are executed at a point where the processing for acquiring the partial feature amount, the processing for obtaining partial recognition score, and the processing for calculating designated value of the occurrence probability of the partial recognition score are executed for only a part of the partial regions; and the category is taken as a recognition result when the total score shows a value likely to be the recognition object category.

13. The object recognition method as claimed in claim 11, wherein: the total score calculation step and the result judgment step are executed at a point where the processing for acquiring the partial feature amount, the processing for obtaining the partial recognition score, and the processing for calculating designated value of the occurrence probability of the partial recognition score are executed for only a part of the partial regions; and the category is taken as a recognition result when the total score shows a value likely to be the recognition object category, and processing for the remaining partial regions is omitted.

14. The object recognition method as claimed in claim 11, comprising: when judged that the object is not a certain recognition object category at the time of judging the category of the object, performing an operation for recognizing whether or not the object is another recognition object category.

15. The object recognition method as claimed in claim 11, comprising: when calculating the designated value of the occurrence probability of the partial recognition score and when assuming that a priori probability of Bayes' formula is the same for the recognition object category and a nonrecognition category, calculating the estimated value of the occurrence probability of the recognition object category in the partial region instead of the occurrence probability of the partial recognition score; and, in the total score calculation step, calculating the total score based on the nonoccurrence probabilities of the recognition object category in the partial regions.

16. The object recognition method as claimed in claim 10, comprising: when judged that the object is not a certain recognition object category at the time of judging the category of the object, performing an operation for recognizing whether or not the object is another recognition object category.

17. The object recognition method as claimed in claim 10, comprising:
    when calculating the designated value of the occurrence probability of the partial recognition score and when assuming that a priori probability of Bayes' formula is the same for the recognition object category and a non-recognition category, calculating the estimated value of the occurrence probability of the recognition object category in the partial region instead of the occurrence probability of the partial recognition score; and,
    in the total score calculation step, calculating the total score based on the nonoccurrence probabilities of the recognition object category in the partial regions.

18. A non-transitory computer readable recording medium storing an object recognition program for recognizing a category of an object based on an image of the object, which enables a computer to execute:
    partial feature amount acquiring processing for acquiring a feature amount of a partial region of the image;
    partial recognition processing for recognizing the category in the partial region and obtaining a partial recognition score;
    occurrence probability calculation processing for calculating an estimated value of an occurrence probability of the partial recognition score under a condition of being a recognition object category;
    total score calculation processing for calculating a total score based on nonoccurrence probabilities of the partial recognition scores of a plurality of the partial regions under the condition of being the recognition object category; and
    result judgment processing for judging the category of the object based on the total score; and
    which enables the computer to calculate the total score according to a numerical formula including a sum total of logarithms of the nonoccurrence probabilities of the partial recognition scores.

19. The non-transitory computer readable recording medium storing the object recognition program as claimed in claim 18, which enables the computer to calculate the total score according to a numerical formula including an operation which divides a sum total of logarithms of the nonoccurrence probabilities of the partial recognition scores by a number of the partial regions.

20. The non-transitory computer readable recording medium storing the object recognition program as claimed in claim 19, which enables the computer to: obtain the total score by executing the total score calculation processing and the result judgment processing at a point where the processing for acquiring the partial feature amount, the processing for obtaining partial recognition score, and the processing for calculating a designated value of the occurrence probability of the partial recognition score are executed for only a part of the partial regions; and to take the category as a recognition result when the total score shows a value likely to be the recognition object category.

21. The non-transitory computer readable recording medium storing the object recognition program as claimed in claim 19, which enables the computer to: obtain the total score by executing the processing for acquiring the partial feature amount, the processing for obtaining partial recognition score, and the processing for calculating a designated value of the occurrence probability of the partial recognition score for only a part of the partial regions; and to take the category as a recognition result when the total score shows a value likely to be the recognition object category.

22. The non-transitory computer readable recording medium storing the object recognition program as claimed in claim 19, which enables the computer to execute, when judged that the object is not a certain recognition object category, an operation for recognizing whether or not the object is another recognition object category.

23. The non-transitory computer readable recording medium storing the object recognition program as claimed in claim 19 which enables the computer to execute: when calculating the designated value of the occurrence probability of the partial recognition score and when assuming that a priori probability of Bayes' formula is the same for the recognition object category and a nonrecognition category, processing for calculating the estimated value of the occurrence probability of the recognition object category in the partial region instead of the occurrence probability of the partial recognition score under the condition of being the recognition object category; and calculating the total score based on the nonoccurrence probabilities of the recognition object category in the partial regions, the recognition object category in the partial regions.

24. The non-transitory computer readable recording medium storing the object recognition program as claimed in claim 18, which enables the computer to execute, when judged that the object is not a certain recognition object category, an operation for recognizing whether or not the object is another recognition object category.

25. The non-transitory computer readable recording medium storing the object recognition program as claimed in claim 18 which enables the computer to execute: when calculating the designated value of the occurrence probability of the partial recognition score and when assuming that a priori probability of Bayes' formula is the same for the recognition object category and a nonrecognition category, processing for calculating the estimated value of the occurrence probability of the recognition object category in the partial region instead of the occurrence probability of the partial recognition score under the condition of being the recognition object category; and calculating the total score based on the nonoccurrence probabilities of the recognition object category in the partial regions.

26. An object recognition system for recognizing a category of an object based on an image of the object, comprising:
   partial feature amount acquisition means for acquiring a feature amount of a partial region of the image;
   partial recognition means for recognizing the category in the partial region and obtains a partial recognition score;
   occurrence probability calculation means for calculating an estimated value of an occurrence probability of the partial recognition score under a condition of being a recognition object category;
   total score calculation means for calculating a total score based on nonoccurrence probabilities of the partial recognition scores of a plurality of the partial regions under the condition of being the recognition object category; and
   result judgment means for judging the category of the object based on the total score,
   wherein the total score calculation device calculates the total score according to a numerical formula including a sum total of logarithms of the nonoccurrence probabilities of the partial recognition scores.

27. An object recognition system for recognizing a category of an object based on an image of the object, comprising:
   a partial feature amount acquisition means which acquires a feature amount of a partial region of the image;
   a partial recognition means which recognizes a category in the partial region and obtains a partial recognition score;
   an occurrence probability calculation means which calculates an estimated value of an occurrence probability of the partial recognition score under a condition of being a recognition object category;
   a total scare calculation means that calculates a total score based on nonoccurrence probabilities of the partial recognition scores of a plurality of the partial regions under the condition of being the recognition object category; and
   a result judgment means which judges the category of the object based on the total score,
   wherein the total score calculation means calculates the total score according to a numerical formula including an operation which divides a sum total of logarithms of the nonoccurrence probabilities of the partial recognition scores by a number of the partial regions.

* * * * *

UNITED STATES PATENT AND TRADEMARK OFFICE
CERTIFICATE OF CORRECTION

PATENT NO.      : 8,478,055 B2                                      Page 1 of 1
APPLICATION NO. : 12/595312
DATED           : July 2, 2013
INVENTOR(S)     : Toshinori Hosoi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 919 days.

Signed and Sealed this
Eighth Day of September, 2015

Michelle K. Lee
*Director of the United States Patent and Trademark Office*